United States Patent Office 2,942,895
Patented June 28, 1960

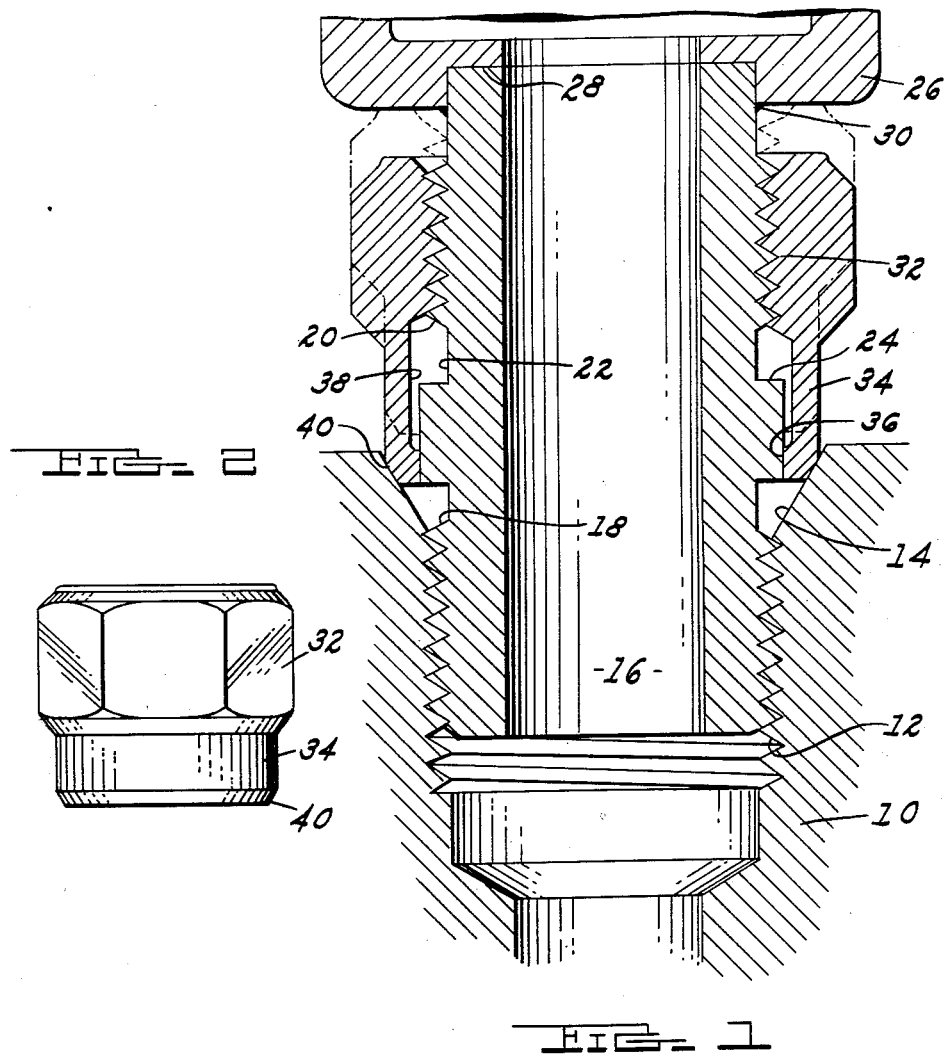

2,942,895

CAPTIVE NUT

Gilbert T. Lyon, Royal Oak, Mich., assignor, by mesne assignments, to L & L Manufacturing Company, East Detroit, Mich., a corporation of Michigan Filed July 13, 1956, Ser. No. 597,740

2 Claims. (Cl. 285—212)

This invention relates to a coupling or fitting for fluid pressure systems and particularly to such a coupling for a high fluid pressure system.

More specifically it relates to a tubular fitting as above described provided with a captive lock nut assembly mounted thereon and operable to lock the fitting within the threaded port of a part with which the fitting is to be connected and to provide a fluid tight seal between the fitting and the wall of the port within the part.

The invention of this application represents a modification or development of the invention disclosed in my co-pending application Serial No. 490,563, filed February 25, 1955, and now abandoned.

In the construction of such co-pending application a captive lock nut assembly is provided upon a tubular fitting and the nut assembly includes a deformable sleeve portion encircling the fitting adjacent to the threaded nut. The sleeve portion of the nut assembly in such prior application is swaged upon the fitting so that it remains captive thereupon and when the lock nut is threaded down on the fitting to lock the fitting within the port of a part with which it is connected, the sleeve is deformable and is swaged by such threading home of the nut so that the sleeve is swaged securely about the fitting and is urged also against the wall of the port into which the fitting is received to effect a tight seal therewith.

The invention of this application includes a captive lock nut assembly mounted upon an externally threaded tubular fitting but the captive lock nut assembly differs from that of my earlier filed application. The lock nut assembly herein includes a sleeve portion which forms an integral part of the nut and projects axially therefrom overhanging the fitting and the end of the sleeve is outwardly beveled to bear against a beveled entrance to the threaded port of the part and such end of the sleeve is provided on its inner face with an inner annular face portion which projects inwardly from the inner surface of the sleeve toward the fitting. Such end of the sleeve is adapted to be wedged between the beveled entrance to the threaded port and an unthreaded length of the fitting disposed between two threaded lengths of the fitting. The sleeve is sufficiently deformable or flexible to permit of it being wedged against the fitting by engagement with the beveled wall of the port to provide a tight seal between the unthreaded length of the fitting and the beveled wall of the port.

A meritorious feature of the invention is that the fitting has an unthreaded length disposed between two threaded lengths and such unthreaded length has an annular land portion of greater external diameter than the remainder of the unthreaded length and of a diameter which approximates the external diameter of one threaded length of the fitting but is greater than the external diameter of the other threaded length of the fitting. The threaded length of the fitting which has the greater external diameter is that threaded length which is adjacent to the end of the fitting.

Another meritorious feature is that the fitting comprises two parts, one part being the portion provided with the two threaded lengths and the unthreaded portion and the lock nut is mounted upon such portion and then the other portion of the lock nut is secured thereto and the nut is thereupon held captive upon the fitting.

Other objects, advantages and meritorious features will more fully appear from the following specification, attached claims and appended drawings, wherein:

Fig. 1 is a fragmentary sectional view through a fitting mounted within a threaded part of a port and provided with my improved lock nut assembly; and Fig. 2 is a side elevation of the lock nut assembly of the coupling.

In the drawings a part 10 is shown as provided with an internally threaded port 12. The entrance to such port is beveled or tapered as at 14. This part 10 may be any suitable portion of a fluid pressure system adapted to receive and contain fluid under pressure.

A fitting is shown as threadedly received within the threaded port of the part. The fitting comprises a tubular portion 16 which is shown as provided with two externally threaded lengths 18 and 20. The threaded length 18 is adjacent to the end of the part 16 and is of a size to be threadedly received within the threaded portion 12 of the port. These two threaded lengths of the fitting are spaced apart by an unthreaded length 22. This unthreaded length has an encircling annular portion 24 which presents an external diameter greater than that of the remainder of the unthreaded length. This portion 24 constitutes a land and is spaced substantially midway between the ends of the unthreaded length 22 of the fitting.

The second part of the fitting is indicated as 26. It is secured to the first part as shown in Fig. 1 in which the second part is shown as counterbored as at 28 to receive the end of the first part and such two parts may be brazed or otherwise secured together as at 30. The second part may constitute any portion of a high pressure fluid system desired to be used as a part of the coupling. It may be an elbow or whatever is required.

A lock nut assembly is mounted upon the first part of the fitting before part 26 is secured to the end of the first part. This lock nut assembly comprises a threaded lock nut portion per se indicated as 32 and a sleeve portion indicated as 34. In the drawing the sleeve portion is shown as formed integrally with the threaded lock nut portion and as projecting axially therebeyond. The sleeve portion has an inner annular face 36 disposed adjacent to the end of the sleeve and which projects inwardly of the remainder of the inner face of the sleeve. It will be seen that the remainder of the face of the sleeve as indicated at 38 has such a diameter that it is spaced beyond the outer face of the land 24 of the fitting. The inner annular face 36 of the sleeve has an internal diameter slightly larger by a .001 or .002 than the outer face of the land 24 so as to pass thereover but it lies very closely adjacent to such outer face of the land.

In the assembly of the lock nut on the fitting the nut is received over that end of the fitting which is thereafter attached to the part 26 and the sleeve passes freely over the threaded length 20 of the fitting and over the annular land 24. The threaded length 18 of the fitting has, however, a greater external diameter than the threaded length 20 and the sleeve cannot be passed thereover. Therefore, when the part 26 is secured to the part 16, the lock nut and sleeve is held captive upon the fitting.

The end of the sleeve is beveled as at 40. It is beveled to an angle corresponding to the angle of the bevel 14 of the entrance to the port. When the fitting is received within the port 12 of the part 10 it is threaded thereinto the required distance and the nut 32 may if necessary be backed off as shown in dotted outline in Fig. 1 and the fitting angularly adjusted to that desired angle to place the part 26 in the position desired for connection with the fluid pressure system. With such part so properly disposed the nut may then be threaded down over the fitting until the beveled face 40 of the end of the sleeve engages the beveled face 14 of the port. The end of the sleeve is then wedged between the beveled face 14 of the port and the annular land 24. The inner face 36 of the sleeve is urged tightly against the outer face of the land so that a tight seal is formed therewith against the fitting and a tight seal is formed by the beveled face 40 of the outer end of the sleeve against the wall of the port providing a secure seal of the fitting within the port against leakage.

What I claim is:

1. A fluid pressure coupling for use with a member provided with a port having an internally threaded portion and an unthreaded tapered wall portion encircling the entrance to the threaded portion comprising, in combination, a fitting having one externally threaded length adjacent to an end of the fitting adapted to be threadedly received within the threaded portion of the port and having a second externally threaded length adjacent to the opposite end of the fitting and spaced from the first-mentioned threaded length by an unthreaded length, said unthreaded length having an external diameter adjacent to each threaded length less than the crest diameter of the threaded length and having a continuous encircling annular land portion of greater diameter than the remainder of the unthreaded portion spaced between the ends of the unthreaded portion and positioned opposed to the tapered wall of the port when the first-mentioned threaded length is threadedly received within the port, annular sealing means encircling the fitting comprising a threaded nut portion threadedly coupled with the second-mentioned threaded length of the fitting and a circumferentially continuous sleeve-like portion of resistingly deformable metal encircling the unthreaded length of the fitting between the nut portion and the beveled entrance to the port for axial compression therebetween, said sleeve portion having an internal diameter throughout the end portion adjacent to the nut sufficiently greater than the external diameter of the unthreaded length of the fitting including the land portion to be received thereover and so as to provide a space therebetween, said sleeve portion having an internal annular land adjacent to the outer end of the sleeve of less internal diameter than the internal diameter of the nut end of the sleeve and opposed to said annular land portion of the unthreaded length of the fitting and lying closely adjacent to said annular land portion of the unthreaded length of the fitting, said sleeve adapted upon threading of the nut over the fitting toward the port to have said annular land portion of the sleeve urged throughout its circumference against said annular land portion of the unthreaded length of the fitting by the wedging of the end of the sleeve against the tapered wall of the port, said opposite end of the fitting provided with a shoulder portion secured thereto projecting outwardly radially beyond the external diameter of the second mentioned threaded length of the fitting.

2. A fluid pressure coupling as defined in claim 1 characterized in that said annular land portion of the unthreaded length of the fitting is spaced between the ends of such unthreaded length and has an external diameter greater than the external diameter of the second-mentioned threaded length of the fitting, and the end of the sleeve adjacent to the tapered wall of the port is beveled on an angle corresponding to that of such tapered wall and the sleeve itself is an integral part of the threaded nut and is deformable so that the inner annular land portion of the sleeve may be urged against the annular land portion of the unthreaded length of the fitting when the end of the sleeve is wedged against the tapered wall of the port and said annular land portion of the fitting, and the internal diameter of the inner annular land portion at the end of the sleeve is greater than the external diameter of the second-mentioned threaded length of the fitting, and the external diameter of the first-mentioned threaded length is greater than the internal diameter of the nut.

References Cited in the file of this patent
UNITED STATES PATENTS

| | | |
|---|---|---|
| 1,523,146 | Stevenson | Jan. 13, 1925 |
| 1,529,734 | Barbour et al. | Mar. 17, 1925 |
| 1,984,887 | Markert | Dec. 18, 1934 |
| 2,342,425 | Parker | Feb. 22, 1944 |
| 2,373,253 | Martin | Apr. 10, 1945 |
| 2,374,284 | Hall | Apr. 24, 1945 |
| 2,541,141 | Woodling | Feb. 13, 1951 |
| 2,582,158 | Porter | Jan. 8, 1952 |
| 2,826,438 | Woodling | Mar. 11, 1958 |

FOREIGN PATENTS

| | | |
|---|---|---|
| 309,529 | Italy | July 8, 1933 |
| 4,654 | Great Britain | Mar. 2, 1896 |